US011053133B2

(12) United States Patent
Fukuoka et al.

(10) Patent No.: US 11,053,133 B2
(45) Date of Patent: Jul. 6, 2021

(54) COMPLEXES OF MAGNESIUM CARBONATE MICROPARTICLES AND FIBERS AS WELL AS PROCESSES FOR PREPARING THEM

(71) Applicant: NIPPON PAPER INDUSTRIES CO., LTD., Tokyo (JP)

(72) Inventors: Moe Fukuoka, Tokyo (JP); Toru Nakatani, Tokyo (JP); Shisei Goto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 455 days.

(21) Appl. No.: 15/757,731

(22) PCT Filed: Sep. 8, 2016

(86) PCT No.: PCT/JP2016/076467
§ 371 (c)(1),
(2) Date: Mar. 6, 2018

(87) PCT Pub. No.: WO2017/043580
PCT Pub. Date: Mar. 16, 2017

(65) Prior Publication Data
US 2019/0047872 A1    Feb. 14, 2019

(30) Foreign Application Priority Data
Sep. 8, 2015    (JP) .............................. JP2015-176270

(51) Int. Cl.
*C01F 5/24*        (2006.01)
*D06M 11/76*    (2006.01)
(Continued)

(52) U.S. Cl.
CPC ............... *C01F 5/24* (2013.01); *B01J 19/008* (2013.01); *B01J 19/10* (2013.01); *B01J 19/26* (2013.01);
(Continued)

(58) Field of Classification Search
CPC ....... D06M 11/76; D21H 17/70; D21H 17/74; D21H 17/675; C01F 5/24
See application file for complete search history.

(56) References Cited

U.S. PATENT DOCUMENTS

| 3,029,181 A | 4/1962 | Thomsen |
| 5,017,268 A | 5/1991 | Clitherow et al. |

(Continued)

FOREIGN PATENT DOCUMENTS

| AU | 2003248412 A1 | 11/2003 |
| EP | 3348519 A1 | 7/2018 |

(Continued)

OTHER PUBLICATIONS

International Search Report for Application No. PCT/JP2016/076467, dated Nov. 15, 2016. 2 pages.
(Continued)

*Primary Examiner* — Jacob T Minskey
(74) *Attorney, Agent, or Firm* — McCarter & English, LLP; Steven G. Davis; Wei Song

(57) ABSTRACT

The present invention aims to provide techniques for preparing complexes of magnesium carbonate particles and a fiber. The complexes of magnesium carbonate microparticles and a fiber can be synthesized efficiently by synthesizing the magnesium carbonate in a solution containing the fiber.

21 Claims, 6 Drawing Sheets

(51) Int. Cl.
*D21H 17/00* (2006.01)
*B01J 19/26* (2006.01)
*B01J 19/10* (2006.01)
*D21H 17/67* (2006.01)
*B01J 19/00* (2006.01)
*D21H 17/70* (2006.01)
*D06M 23/06* (2006.01)
*D06M 101/02* (2006.01)

(52) U.S. Cl.
CPC ............ *D06M 11/76* (2013.01); *D06M 23/06* (2013.01); *D21H 17/675* (2013.01); *D21H 17/70* (2013.01); *D21H 17/74* (2013.01); *B01J 2219/00051* (2013.01); *B01J 2219/00162* (2013.01); *C01P 2004/20* (2013.01); *C01P 2004/30* (2013.01); *C01P 2004/50* (2013.01); *C01P 2004/61* (2013.01); *C01P 2004/62* (2013.01); *C01P 2004/64* (2013.01); *D06M 2101/02* (2013.01)

(56) References Cited

U.S. PATENT DOCUMENTS

| | | | |
|---|---|---|---|
| 5,665,205 | A | 9/1997 | Srivatsa et al. |
| 5,679,220 | A | 10/1997 | Matthew et al. |
| 5,731,080 | A | 3/1998 | Cousin et al. |
| 6,680,086 | B1 | 1/2004 | Nissinen et al. |
| 7,922,991 | B2 * | 4/2011 | Mitsuhashi ............ C05D 5/00 423/430 |
| 9,725,599 | B2 * | 8/2017 | Buri ........................ C09C 1/021 |
| 2005/0129606 | A1 | 6/2005 | Mitsuhashi et al. |
| 2009/0026064 | A1 | 1/2009 | McCausland et al. |
| 2010/0331457 | A1 | 12/2010 | Buri et al. |
| 2011/0000633 | A1 | 1/2011 | Kukkamaki et al. |
| 2015/0167244 | A1 | 6/2015 | Solismaa |
| 2018/0282936 | A1 | 10/2018 | Fukuoka et al. |

FOREIGN PATENT DOCUMENTS

| | | |
|---|---|---|
| JP | 47-41238 B1 | 10/1972 |
| JP | 49-46529 B1 | 12/1974 |
| JP | 6-158585 A | 6/1994 |
| JP | 2002-520503 A | 7/2002 |
| JP | 2003-306325 A | 10/2003 |
| JP | 2003-342894 A | 12/2003 |
| JP | 2005-220055 A | 8/2005 |
| JP | 2005-220082 A | 8/2005 |
| JP | 2008-505829 A | 2/2008 |
| JP | 2010-82776 A | 4/2010 |
| JP | 2011-506789 A | 3/2011 |
| JP | 2013-521417 A | 6/2013 |
| JP | 2013-536329 A | 9/2013 |
| JP | 2014-65752 A | 4/2014 |
| WO | WO-2005/033403 A1 | 4/2005 |
| WO | 2011/110744 A2 | 9/2011 |
| WO | WO-2011/151525 A1 | 12/2011 |
| WO | 2015/050126 A1 | 4/2015 |

OTHER PUBLICATIONS

Supplementary European Search Report for Application No. 16844441. 2, dated Mar. 20, 2019, 11 pages.
U.S. Appl. No. 15/764,136, filed Jun. 27, 2018, 2018-0282936.
International Search Report for Application No. PCT/JP2016/077902, dated Dec. 20, 2016. 2 pages.
Supplementary European Search Report for Application No. 16851328. 1, dated May 27, 2019, 7 pages.

* cited by examiner

COMPLEXES OF MAGNESIUM CARBONATE MICROPARTICLES AND FIBERS AS WELL AS PROCESSES FOR PREPARING THEM

CROSS-REFERENCE TO RELATED APPLICATIONS

This application is a U.S. national stage filing, under 35 U.S.C. § 371(c), of International Application No. PCT/JP2016/076467, filed on Sep. 8, 2016, which claims priority to Japanese Patent Application No. 2015-176270, filed on Sep. 8, 2015. The entire contents of each of the aforementioned applications are incorporated herein by reference.

TECHNICAL FIELD

The present invention relates to complexes of magnesium carbonate microparticles and fibers as well as processes for preparing them. In particular, the present invention relates to complexes comprising magnesium carbonate microparticles adhered to the surface of a fiber and processes for preparing them.

BACKGROUND ART

In general, magnesium carbonate is prepared by mechanically grinding and classifying natural magnesite or by adding sodium carbonate or potassium carbonate to an aqueous magnesium salt solution to give a precipitate (basic magnesium carbonate, $MgCO_3 \cdot Mg(OH)_2$). The composition of basic magnesium carbonate is $mMgCO_3 \cdot Mg(OH)_2 \cdot nH_2O$ wherein m is often 3 to 5 and n is 3 to 7, depending on the production process. Magnesium carbonate is a white powder sparingly soluble in water and widely used as antacids, abrasives, anti-slip powder for various types of gymnastic equipment and the like.

For example, a known process for preparing a basic magnesium carbonate comprises combining magnesium hydroxide and carbon dioxide to give magnesium bicarbonate, which is converted into a normal magnesium carbonate, and then increasing the temperature or pH to give the basic magnesium carbonate.

On the other hand, various techniques for depositing inorganic matters such as calcium carbonate on fibers such as pulps have been proposed. PTL 1 describes a complex comprising a crystalline calcium carbonate mechanically bonded on a fiber. PTL 2 describes a technique for preparing a complex of a pulp and a calcium carbonate by precipitating the calcium carbonate in a suspension of the pulp by the carbonation process. PTL 3 describes a technique for improving the brightness and purity of a waste paper fiber by adding a large amount of a filler for papers and paperboards to the fiber, which comprises sending a slurry of a waste paper pulp to a gas-liquid contactor where the pulp is broken down by contact with a slurry of an alkali salt travelling in a counter-flow direction to the flow direction of the pulp in a contact/breaking zone and sending a suitable reactive gas and mixing it with the precipitating filler to deposit the filler on the surface of the fiber.

CITATION LIST

Patent Literature

PTL 1: JPA 1994-158585
PTL 2: U.S. Pat. No. 5,679,220
PTL 3: U.S. Pat. No. 5,665,205

SUMMARY OF INVENTION

Technical Problem

The present invention aims to provide complexes of magnesium carbonate microparticles and a fiber as well as techniques for efficiently preparing them.

Solution to Problem

As a result of careful studies about the problems described above, we accomplished the present invention on the basis of the finding that magnesium carbonate microparticles form stable complexes with a fiber by synthesizing the magnesium carbonate microparticles in the presence of the fiber. Particularly according to preferred embodiments of the present invention, a complex of a magnesium carbonate having a small primary particle size and a fiber can be prepared efficiently by synthesizing the magnesium carbonate in the presence of cavitation bubbles. In the complex of magnesium carbonate microparticles and a fiber obtained by the present invention, the magnesium carbonate microparticles adhered to the fiber have a uniform shape and unique characteristics can be conferred on the fiber. Further, the microparticles can be dehydrated/dried into a form that is easy to handle because they are adhered to the fiber.

Thus, the present invention includes, but not limited to, the following:

(1) A process for preparing a complex of magnesium carbonate particles and a fiber, comprising synthesizing the magnesium carbonate in a solution containing the fiber.
(2) The process of (1), wherein the magnesium carbonate particles have an average particle size of 50 μm or less.
(3) The process of (1) or (2), comprising synthesizing the magnesium carbonate from magnesium hydroxide.
(4) The process of any one of (1) to (3), comprising synthesizing the magnesium carbonate by injecting an aqueous suspension containing magnesium hydroxide into a reaction vessel.
(5) The process of any one of (1) to (4), comprising synthesizing the magnesium carbonate in the presence of cavitation bubbles.
(6) The process of any one of (1) to (5), comprising reacting an aqueous suspension of the starting material and a gas containing carbon dioxide in the presence of cavitation bubbles.
(7) The process of any one of (1) to (6), wherein the cavitation bubbles are generated by injecting a liquid into a reaction vessel.
(8) The process of any one of (1) to (7), wherein the fiber is a pulp fiber.
(9) The process of any one of (1) to (8), wherein the cavitation bubbles are generated by injecting an aqueous suspension containing magnesium hydroxide into a reaction vessel.
(10) The process of any one of (1) to (9), wherein the reaction solution circulated from the reaction vessel is used as the aqueous suspension.
(11) The process of any one of (1) to (10), wherein the magnesium carbonate has a primary particle size of 10 nm to 3 μm.
(12) The process of any one of (1) to (11), wherein the weight ratio between the magnesium carbonate and the fiber is 5:95 to 95:5.

(13) The process of any one of (1) to (12), wherein the reaction vessel is a pressure vessel.
(14) The process of any one of (1) to (13), comprising using an aqueous suspension of a premixture of magnesium hydroxide and a pulp.
(15) The process of any one of (1) to (14), further comprising hydrophobizing the complex.
(16) A complex of magnesium carbonate particles having an average particle size of 50 μm or less and a fiber.
(17) The complex of (16), wherein the fiber is a pulp fiber.
(18) The complex of (16) or (17), wherein the weight ratio between the magnesium carbonate particles and the fiber is 5:95 to 95:5.
(19) The complex of any one of (16) to (18) synthesized by the process of any one of (1) to (15).
(20) The complex of any one of (16) to (19), wherein the magnesium carbonate is a basic magnesium carbonate.
(21) A product comprising the complex of any one of (16) to (20).
(22) The product of (21), which is in the form of a sheet.

Advantageous Effects of Invention

According to the present invention, complexes of magnesium carbonate microparticles and a fiber can be prepared efficiently by synthesizing the magnesium carbonate in the presence of the fiber. Further, products having a high ash retention can be obtained when they contain the resulting complexes of magnesium carbonate microparticles and a fiber. Especially, the resulting complexes of magnesium carbonate microparticles and a fiber can be formed into sheets having a high ash retention. Moreover, the complexes of the present invention are also excellent in flame retardancy.

In preferred embodiments of the present invention, a complex of magnesium carbonate microparticles and a fiber can be synthesized in a short time by synthesizing the magnesium carbonate in the presence of cavitation bubbles in a solution containing the fiber. The reason for this is not known in detail, but can be explained by the following assumption though the present invention is not bound to it. That is, it is assumed that the dissolution/microdispersion efficiency of carbonic acid gas is improved by the generation of cavitation under pressure and the reaction is activated by fine bubbles generated by the cavitation so that magnesium carbonate microparticles are prepared with good efficiency and that the magnesium carbonate microparticles are deposited on the surface of the fiber serving as a carrier for the magnesium carbonate, whereby the complex of the present invention has unique characteristics. Further, it is assumed that a complex comprising magnesium carbonate microparticles firmly bound to a fiber could be obtained because magnesium ions adsorbed on the surface of the fiber and penetrated into it combine with carbonic acid gas.

DESCRIPTION OF EMBODIMENTS

Figure 1:
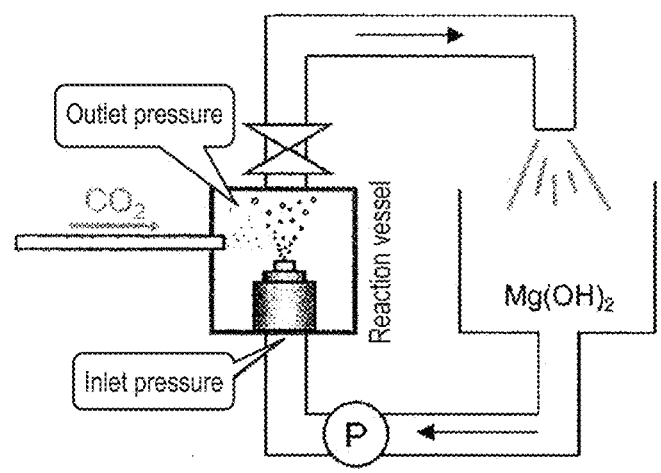
FIG. 1 is a schematic diagram showing the reaction system used in the examples of the present invention.

In the present invention, complexes of magnesium carbonate microparticles and a fiber are prepared by synthesizing the magnesium carbonate in the presence of cavitation bubbles in a solution containing the fiber.
Magnesium Carbonate
According to the present invention, complexes of a magnesium carbonate and a fiber can be prepared efficiently. The magnesium carbonate microparticles forming part of the complexes of the present invention have an average particle size of less than 50 μm, and further may have an average particle size of 30 μm or less. In preferred embodiments, the magnesium carbonate microparticles can have an average primary particle size in the order of 10 nm to 3 μm.

Further, the magnesium carbonate obtained by the present invention may take the form of secondary particles resulting from the aggregation of fine primary particles wherein the secondary particles can be produced to suit the intended purposes, or aggregates can be broken down by grinding. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, breakers, beaters, single screw extruders, twin screw extruders, ultrasonic stirrers, juicers/mixers for home use, etc.

In the present invention, the magnesium carbonate can be synthesized from, for example, a raw material selected from the group consisting of magnesium oxide, magnesite, dolomite, huntite, magnesium carbonate, magnesium hydroxide, brucite and mixtures thereof. In preferred embodiments, the magnesium carbonate of the present invention is synthesized from magnesium hydroxide.

The complexes obtained by the present invention can be used in various shapes including, for example, powders, pellets, moldings, aqueous suspensions, pastes, sheets and other shapes. Further, the complexes can be used as main components to form molded products such as moldings and particles or pellets with other materials. The dryer used to dry the complexes to form powders is not specifically limited either, and air-flow dryers, band dryers, spray dryers and the like can be suitably used, for example.

The complexes obtained by the present invention can be used for various applications and they can be widely used for any applications including, for example, papers, fibers, cellulosic composite materials, filter materials, paints, plastics and other resins, rubbers, elastomers, ceramics, glasses, tires, construction materials (asphalt, asbestos, cement, boards, concrete, bricks, tiles, plywoods, fiber boards and the like), various carriers (catalyst carriers, drug carriers, agrochemical carriers, microbial carriers and the like), adsorbents (decontaminants, deodorants, dehumidifying agents and the like), anti-wrinkle agents, clay, abrasives, modifiers, repairing materials, thermal insulation materials, heat resistant materials, heat dissipation materials, damp proofing materials, water repellent materials, waterproofing materials, light shielding materials, sealants, shielding materials, insect repellents, adhesives, inks, cosmetics, medical materials, paste materials, discoloration inhibitors, food additives, tablet excipients, dispersants, structuring agents, water retention agents, filter aids, oil rectification additives, oil processing additives, oil reforming additives, electromagnetic wave absorbers, insulating materials, acoustic insulation materials, vibration damping materials, semiconductor sealing materials, radiation shielding materials, cosmetics, fertilizers, feedstuffs, perfumes, additives for paints and adhesives, flame retardant materials, sanitary products (disposable diapers, sanitary napkins, incontinence pads, nursing pads and the like), etc. They also can be used for various fillers, coating agents and the like in the applications listed above. Among them, they are preferably used for flame retardant materials.

The complexes of the present invention may also be applied for papermaking purposes including, for example, printing papers, newsprint papers, inkjet printing papers, PPC papers, kraft papers, woodfree papers, coated papers, coated fine papers, wrapping papers, thin papers, colored woodfree papers, cast-coated papers, carbonless copy papers, label papers, heat-sensitive papers, various fancy papers, water-soluble papers, release papers, process papers, hanging base papers, incombustible papers, flame retardant papers, base papers for laminated boards, printed electronics papers, battery separators, cushion papers, tracing papers, impregnated papers, papers for ODP, building papers, papers for decorative building materials, envelope papers, papers for tapes, heat exchange papers, chemical fiber papers, aseptic papers, water resistant papers, oil resistant papers, heat resistant papers, photocatalytic papers, cosmetic papers (facial blotting papers and the like), various sanitary papers (toilet papers, facial tissues, wipers, diapers, menstrual products and the like), cigarette rolling papers, paperboards (liners, corrugating media, white paperboards and the like), base papers for paper plates, cup papers, baking papers, abrasive papers, synthetic papers and the like. Thus, the present invention makes it possible to provide complexes of magnesium carbonate microparticles and a fiber so that large amounts of the magnesium carbonate can be adhered to the fiber. They can be formed into sheets in which a magnesium carbonate is not only more readily retained but also uniformly dispersed without being aggregated in contrast to those in which a magnesium carbonate having a small primary particle size is simply added to a fiber. The magnesium carbonate here is not only adhered to the outer surface and the inside of the lumen of the fiber but also can be produced within microfibrils, which can be evidenced by electron microscopic observation.

Further, the magnesium carbonate complexes obtained by the present invention can be used typically in combination with particles known as inorganic fillers and organic fillers or various fibers. For example, inorganic fillers include calcium carbonate (precipitated calcium carbonate, ground calcium carbonate), barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, silica products prepared from sodium silicate and a mineral acid (white carbon, silica/calcium carbonate complexes, silica/titanium dioxide complexes), terra alba, bentonite, diatomaceous earth, calcium sulfate, zeolite, inorganic fillers recycled from ash obtained in a deinking process and inorganic fillers consisting of complexes of ash formed with silica or calcium carbonate during recycling, etc. In the calcium carbonate-silica complexes, amorphous silicas such as white carbon may also be used in addition to calcium carbonate and/or precipitated calcium carbonate-silica complexes. Organic fillers include urea-formaldehyde resins, polystyrene resins, phenol resins, hollow microparticles, acrylamide complexes, wood-derived materials (microfibers, microfibrillar fibers, kenaf powders), modified/insolubilized starches, ungelatinized starches and the like. Fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps), bacterial celluloses, animal-derived celluloses such as Ascidiacea, algae, etc., among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla*,

*Populus nigra* var. *italica*, poplars, *Fraxinus, Populus maximowiczii, Eucalyptus*, mangroves, Meranti, *Acacia* and mixed materials thereof. The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching). Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera, Edgeworthia chrysantha* and the like. The wood pulps and non-wood pulps may be unbeaten or beaten. Moreover, these cellulosic raw materials can be further treated so that they can also be used as powdered celluloses, chemically modified celluloses such as oxidized celluloses, and cellulose nanofibers (CNFs) (microfibrillated celluloses (MFCs), TEMPO-oxidized CNFs, phosphate esters of CNFs, carboxymethylated CNFs, mechanically ground CNFs). Synthetic fibers include polyesters, polyamides, polyolefins, and acrylic fibers; semisynthetic fibers include rayon, acetate and the like; and inorganic fibers include glass fiber, carbon fiber, various metal fibers and the like. All these may be used alone or as a combination of two or more of them.

The average particle size or shape or the like of the magnesium carbonate forming part of the complexes of the present invention can be identified by electron microscopic observation. Further, magnesium carbonate microparticles having various sizes or shapes can be complexed with a fiber by controlling the conditions under which the magnesium carbonate is synthesized.

Processes for preparing the complexes of the present invention essentially comprise synthesizing a magnesium carbonate in a solution containing a fiber. The fiber can be dispersed in the reaction solution during the stage when magnesium hydroxide is obtained from a magnesium hydroxide precursor such as magnesium oxide or the like. Alternatively, the fiber can also be dispersed during the step of obtaining a magnesium carbonate from magnesium hydroxide. In either case, complexes of a magnesium carbonate and a fiber can be obtained efficiently by immersing the fiber in the reaction solution to swell it because the reaction solution is alkaline. After dispersing the fiber, a carbonation reaction can be started immediately or a carbonation reaction can be started after swelling of the fiber has been promoted by stirring for 15 minutes or more. For example, a magnesium carbonate may be synthesized by injecting an aqueous suspension containing magnesium hydroxide into a reaction vessel. As described later, a preferred embodiment comprises synthesizing a magnesium carbonate in the presence of cavitation bubbles generated during the injection of an aqueous suspension of magnesium hydroxide into a reaction vessel.

In the present invention, a liquid may be injected under conditions where cavitation bubbles are generated in a reaction vessel or may be injected under conditions where cavitation bubbles are not generated. The reaction vessel is preferably a pressure vessel in either case, but an open reaction vessel may also be used without any inconvenience. It should be noted that the pressure vessel in the present invention can withstand a pressure of 0.005 MPa or more in preferred embodiments. Under conditions where cavitation bubbles are not generated, the pressure in the pressure vessel is preferably 0.005 MPa or more and 0.9 MPa or less expressed in static pressure.

Cavitation Bubbles

In the processes for preparing the complexes of the present invention, a magnesium carbonate is preferably synthesized in the presence of cavitation bubbles. As used herein, the term "cavitation" refers to a physical phenomenon in which bubbles are generated and disappear in the flow of a fluid in a short time due to a pressure difference. The bubbles generated by cavitation (cavitation bubbles) develop from very small "bubble nuclei" of 100 μm or less present in a liquid when the pressure drops below the saturated vapor pressure in the fluid only for a very short time.

In the present invention, cavitation bubbles can be generated in a reaction vessel by known methods. For example, it is possible to generate cavitation bubbles by injecting a fluid under high pressure, or by stirring at high speed in a fluid, or by causing an explosion in a fluid, or by using an ultrasonic vibrator (vibratory cavitation) or the like.

Particularly in the present invention, cavitation bubbles are preferably generated by injecting a fluid under high pressure because the cavitation bubbles are readily generated and controlled. In this embodiment, a liquid to be injected is compressed by using a pump or the like and injected at high speed through a nozzle or the like, whereby cavitation bubbles are generated simultaneously with the expansion of the liquid itself due to a very high shear force and a sudden pressure drop near the nozzle. Fluid jetting allows cavitation bubbles to be generated with high efficiency, whereby the cavitation bubbles have stronger collapse impact. In the present invention, a magnesium carbonate is synthesized in the presence of controlled cavitation bubbles, clearly in contrast to the cavitation bubbles spontaneously occurring in fluid machinery and causing uncontrollable risks.

In the present invention, the reaction solution of a raw material or the like can be directly used as a jet liquid to generate cavitation, or some fluid can be injected into the reaction vessel to generate cavitation bubbles. The fluid forming a liquid jet may be any of a liquid or a gas or a solid such as a powder or pulp or a mixture thereof so far as it is in a flowing state. Moreover, another fluid such as carbonic acid gas can be added as an additional fluid to the fluid described above, if desired. The fluid described above and the additional fluid may be injected as a homogeneous mixture or may be injected separately.

The liquid jet refers to a jet of a liquid or a fluid containing solid particles or a gas dispersed or mixed in a liquid, such as a liquid jet containing a slurry of a pulp or inorganic particles or bubbles. The gas here may contain bubbles generated by cavitation.

The flow rate and pressure are especially important for cavitation because it occurs when a liquid is accelerated and a local pressure drops below the vapor pressure of the liquid. Therefore, the cavitation number σ, which is a basic dimensionless number expressing a cavitation state, is defined by equation 1 below ("New Edition Cavitation: Basics and Recent Advance", Written and Edited by Yoji Katoh, Published by Makishoten, 1999).

[Formula 1]

$$\sigma = \frac{p_\infty - p_v}{\frac{1}{2}\rho U_\infty^2} \quad (1)$$

If the cavitation number here is high, it means that the flow site is in a state where cavitation is less likely to occur. Especially when cavitation is generated through a nozzle or an orifice tube as in the case of a cavitation jet, the cavitation number σ can be rewritten by equation (2) below where $p_1$ is the nozzle upstream pressure, $p_2$ is the nozzle downstream pressure, and $p_v$ is the saturated vapor pressure of sample water, and the cavitation number σ can be further approximated as shown by equation (2) below because the pressure difference between $p_1$, $p_2$ and $p_v$ is significant in a cavitation jet so that $p_1 \gg p_2 \gg p_v$ (H. Soyama, J. Soc. Mat. Sci. Japan, 47 (4), 381 1998).

[Formula 2]

$$\sigma = \frac{p_2 - p_v}{p_1 - p_2} \cong \frac{p_2}{p_1} \quad (2)$$

Cavitation conditions in the present invention are as follow: the cavitation number σ defined above is desirably 0.001 or more and 0.5 or less, preferably 0.003 or more and 0.2 or less, especially preferably 0.01 or more and 0.1 or less. If the cavitation number σ is less than 0.001, little benefit is attained because the pressure difference from the surroundings is small when cavitation bubbles collapse, but if it is greater than 0.5, the pressure difference in the flow is too small to generate cavitation.

When cavitation is generated by emitting a jetting liquid through a nozzle or an orifice tube, the pressure of the jetting liquid (upstream pressure) is desirably 0.01 MPa or more and 30 MPa or less, preferably 0.7 MPa or more and 20 MPa or less, more preferably 2 MPa or more and 15 MPa or less. If the upstream pressure is less than 0.01 MPa, little benefit is attained because a pressure difference is less likely to occur from the downstream pressure. If the upstream pressure is higher than 30 MPa, a special pump and pressure vessel are required and energy consumption increases, leading to cost disadvantages. On the other hand, the pressure in the vessel (downstream pressure) is preferably 0.05 MPa or more and 0.9 MPa or less expressed in static pressure. Further, the ratio between the pressure in the vessel and the pressure of the jetting liquid is preferably in the range of 0.001 to 0.5.

In the present invention, a magnesium carbonate can also be synthesized by injecting a jetting liquid under conditions where cavitation bubbles are not generated. Specifically, the pressure of the jetting liquid (upstream pressure) is set at 2 MPa or less, preferably 1 MPa or less, while the pressure of the jetting liquid (downstream pressure) is released, more preferably set at 0.05 MPa or less.

The jet flow rate of the jetting liquid is desirably in the range of 1 m/sec or more and 200 m/sec or less, preferably in the range of 20 m/sec or more and 100 m/sec or less. If the jet flow rate is less than 1 m/sec, little benefit is attained because the pressure drop is too small to generate cavitation. If it is greater than 200 m/sec, however, special equipment is required to generate high pressure, leading to cost disadvantages.

In the present invention, cavitation may be generated in a reaction vessel where a magnesium carbonate is synthesized. The process can be run in one pass, or can be run through a necessary number of cycles. Further, the process can be run in parallel or in series using multiple generating means.

Liquid injection for generating cavitation may take place in a vessel open to the atmosphere, but preferably within a pressure vessel to control cavitation.

When cavitation is generated by liquid injection, the solids content of the aqueous suspension of magnesium hydroxide forming the reaction solution is preferably 30% by weight or less, more preferably 20% by weight or less. This is because cavitation bubbles are more likely to homogeneously act on the reaction system at such levels. Further, the solids content of the aqueous suspension is preferably 0.1% by weight or more in terms of the reaction efficiency.

In the present invention, the pH of the reaction solution is basic at the beginning of the reaction, but changes to neutral as the carbonation reaction proceeds. Thus, the reaction can be controlled by monitoring the pH of the reaction solution.

In the present invention, stronger cavitation can be generated by increasing the jetting pressure of the liquid because the flow rate of the jetting liquid increases and accordingly the pressure decreases. Moreover, the impact force can be stronger by increasing the pressure in the reaction vessel because the pressure in the region where cavitation bubbles collapse increases and the pressure difference between the bubbles and the surroundings increases so that the bubbles vigorously collapse. This also helps to promote the dissolution and dispersion of the carbonic acid gas introduced. The reaction temperature is preferably 0° C. or more and 90° C. or less, especially preferably 10° C. or more and 60° C. or less. The reaction temperature may be at least 20° C. and at most 80° C. Given that the impact force is generally thought to be maximal at the midpoint between the melting point and the boiling point, the temperature is suitably around 50° C. in cases of aqueous solutions, though significant benefits can be obtained even at lower temperatures within the ranges defined above because there is no influence of vapor pressure.

In the the present invention, the energy required for generating cavitation can be reduced by adding a surfactant. Surfactants that may be used include known or novel surfactants, e.g., nonionic surfactants, anionic surfactants, cationic surfactants and amphoteric surfactants such as fatty acid salts, higher alkyl sulfates, alkyl benzene sulfonates, higher alcohols, alkyl phenols, alkylene oxide adducts of fatty acids and the like. These may be used alone or as a mixture of two or more components. They may be added in any amount necessary for lowering the surface tension of the jetting liquid and/or target liquid.

Synthesis of Complexes of Magnesium Carbonate Microparticles and a Fiber

In the present invention according to which magnesium carbonate microparticles are synthesized in a solution containing a fiber, the magnesium carbonate is synthesized by a known method. For example, a basic magnesium carbonate can be synthesized via a normal magnesium carbonate from magnesium bicarbonate, which is synthesized from magnesium hydroxide and carbonic acid gas. Magnesium carbonate can be obtained in various forms such as magnesium bicarbonate, normal magnesium carbonates, basic magnesium carbonates and the like depending on the synthesis method, among which the magnesium carbonate forming part of the complexes of the present invention is especially preferably in the form of a basic magnesium carbonate. This is because magnesium bicarbonate is relatively unstable, while normal magnesium carbonates produced as columnar (needle-like) crystals may be less likely to adhere to fibers. However, complexes of a magnesium carbonate and a fiber wherein the surface of the fiber is covered by the magnesium carbonate like fish scales can be obtained if a chemical reaction is performed in the presence of the fiber until a basic magnesium carbonate is formed.

The present invention relates to complexes of a magnesium carbonate and a fiber, and in a preferred embodiment, 15% or more of the surface of the fiber is covered by the magnesium carbonate. In a preferred embodiment of the complexes of the present invention, the ratio (area ratio) at which the fiber is covered by the magnesium carbonate is 25% or more, more preferably 40% or more, and complexes having a coverage ratio of 60% or more or even 80% or more can also be prepared according to the present invention.

The complexes of a magnesium carbonate and a fiber according to the present invention can be formed into products in which the magnesium carbonate is not only more readily retained but also uniformly dispersed without being aggregated in contrast to simple mixtures of the magnesium carbonate and the fiber. Thus, the present invention allows the retention of the complexes of a magnesium carbonate and a fiber in the products prepared therefrom (the proportion by weight of the input magnesium carbonate remaining in the products) to be 60% or more, even 70% or more or 90% or more.

In the present invention, the magnesium carbonate is preferably synthesized in the presence of cavitation bubbles. Here, every step of the synthetic route of the magnesium carbonate need not be performed in the presence of cavitation bubbles, but at least one step may be performed in the presence of cavitation bubbles.

For example, a basic magnesium carbonate is prepared by using magnesium oxide MgO as a magnesium source, then injecting carbonic acid gas $CO_2$ into magnesium hydroxide $Mg(OH)_2$ obtained from the magnesium oxide to give magnesium bicarbonate $Mg(HCO_3)_2$, which is converted into the basic magnesium carbonate via a normal magnesium carbonate $MgCO_3.3H_2O$. The basic magnesium carbonate can be synthesized on a fiber by synthesizing the magnesium carbonate in the presence of the fiber. In a preferred embodiment, the synthesis of the magnesium carbonate may be performed in the presence of cavitation bubbles, but any one of the synthesis steps of the magnesium carbonate may be performed in the presence of cavitation bubbles in the present invention. In a preferred embodiment, the step of synthesizing magnesium bicarbonate from magnesium hydroxide can be performed in the presence of cavitation bubbles. In another embodiment, the step of synthesizing a basic magnesium carbonate from magnesium bicarbonate or a normal magnesium carbonate can be performed in the presence of cavitation bubbles. In still another embodiment, the basic magnesium carbonate can be aged in the presence of cavitation bubbles after it has been synthesized.

Typically known reactors for preparing a magnesium carbonate include gas injection systems and mechanically stirred systems. The gas injection systems inject carbonic acid gas into a reaction vessel containing magnesium hydroxide to perform a reaction, but it is difficult to uniformly and precisely control the size of bubbles simply by injecting carbonic acid gas, which imposes limitations in terms of the reaction efficiency. On the other hand, the mechanically stirred systems are equipped with a stirrer inside the systems and introduce carbonic acid gas near the stirrer, thereby dispersing the carbonic acid gas as fine bubbles to improve the efficiency of the reaction with the carbonic acid gas.

If the reaction solution had a high concentration or the carbonation reaction proceeded in cases where stirring took place with a stirrer provided within a reactor as in mechanically stirred systems, however, the resistance of the reaction solution increased to make it difficult to sufficiently stir it and therefore make it difficult to exactly control the carbonation reaction or the stirrer is subjected to a considerable load for sufficient stirring, thus leading to energy disadvantages. When a gas injection port is located at a lower site of the reactor and blades of the stirrer are provided near the bottom of the reactor to allow better stirring, less soluble components stay at the bottom, thereby blocking the gas injection port or disturbing the balance of the stirrer. Moreover, conventional methods required not only a reactor but also a stirrer and equipment for introducing carbonic acid gas into the reactor, which also incurred much costs of equipment. In the mechanically stirred systems, carbonic acid gas supplied near a stirrer are dispersed as fine bubbles by the stirrer to improve the reaction efficiency, but the carbonic acid gas could not be dispersed as sufficiently fine bubbles if the concentration of the reaction solution was high or in other cases and it was also sometimes difficult to precisely control the morphology or the like of the produced inorganic particles in the carbonation reaction. In the present invention, a magnesium carbonate is synthesized in the presence of cavitation bubbles, whereby the carbonation reaction proceeds efficiently and uniform magnesium carbonate microparticles can be prepared on a fiber. Especially, the use of a jet cavitation allows sufficient stirring without any mechanical stirrer such as blades. In the present invention, previously known reactors can be used, including the gas injection systems and the mechanically stirred systems as described above without any inconveniences as a matter of course, and these reactors may be combined with a jet cavitation using a nozzle or the like.

When a magnesium carbonate is synthesized by the present invention, the aqueous suspension of magnesium hydroxide preferably has a solids content of 0.1 to 40% by weight, more preferably 0.5 to 30% by weight, still more preferably in the order of 1 to 20% by weight. If the solids content is low, the reaction efficiency decreases and the production cost increases, but if the solids content is too high, the flowability decreases and the reaction efficiency decreases. In the present invention, a magnesium carbonate is synthesized in the presence of cavitation bubbles so that the reaction solution and carbonic acid gas can be mixed well even if a suspension (slurry) having a high solids content is used.

The aqueous suspension containing magnesium hydroxide that can be used includes those commonly used, and can be prepared by, for example, mixing magnesium hydroxide with water or by adding magnesium oxide to water. The conditions under which a slurry of magnesium hydroxide is prepared from magnesium oxide include, but not specifically limited to, an MgO concentration of 0.1% by weight or more, preferably 1% by weight or more, and a temperature of 20 to 100° C., preferably 30 to 100° C. for 5 minutes to 5 hours (preferably 2 hours or less), for example. The reactor may be batch or continuous. It should be noted that the preparation of the slurry of magnesium hydroxide and the carbonation reaction may be performed using separate reactors or one reactor in the present invention.

The present invention uses water for preparing the suspension or for other purposes, including common tap water, industrial water, groundwater, well water and the like, and also can conveniently use ion-exchanged water, distilled water, ultrapure water, industrial waste water, and the water resulting from the separation/dehydration of the magnesium carbonate slurry obtained in the reaction processes of the present invention.

Further in the present invention, the reaction solution can be circulated and used as a liquid containing magnesium hydroxide. If the reaction solution is circulated in this way to increase contacts between the reaction solution and carbonic acid gas, the reaction efficiency increases and a desired magnesium carbonate can be easily obtained.

In the present invention, a gas containing carbon dioxide (carbonic acid gas) is injected into a reaction vessel where it is mixed with the reaction solution. According to the present invention, the carbonation reaction can be performed with good efficiency because carbonic acid gas can be supplied to the reaction solution without any gas feeder such as a fan, blower or the like, and the carbonic acid gas is finely dispersed by cavitation bubbles.

In the present invention, the carbon dioxide concentration of the gas containing carbon dioxide is not specifically limited, but the carbon dioxide concentration is preferably higher. Further, the amount of carbonic acid gas introduced into the reaction vessel is not limited and can be selected as appropriate, but carbonic acid gas is preferably used at a flow rate of 100 to 10000 L/hr per kg of magnesium hydroxide, for example.

The gas containing carbon dioxide of the present invention may be substantially pure carbon dioxide gas or a mixture with another gas. For example, a gas containing an inert gas such as air or nitrogen in addition to carbon dioxide gas can be used as the gas containing carbon dioxide. Further, gases containing carbon dioxide other than carbon dioxide gas (carbonic acid gas) that can be conveniently used include exhaust gases discharged from incinerators, coal-fired boilers, heavy oil-fired boilers and the like in papermaking factories. In addition, the carbonation reaction can also be performed using carbon dioxide generated from the lime calcination process.

For preparing the complexes of the present invention, various known auxiliaries can also be added. For example, chelating agents can be added in the carbonation reaction, specifically including polyhydroxycarboxylic acids such as citric acid, malic acid, and tartaric acid; dicarboxylic acids such as oxalic acid; sugar acids such as gluconic acid; aminopolycarboxylic acids such as iminodiacetic acid and ethylenediamine tetraacetic acid and alkali metal salts thereof; alkali metal salts of polyphosphoric acids such as hexametaphosphoric acid and tripolyphosphoric acid; amino acids such as glutamic acid and aspartic acid and alkali metal salts thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated fatty acids such as oleic acid and linoleic acid; alicyclic carboxylic acids; resin acids such as abietic acid; as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, condensed phosphoric acids and the like. Further, dispersants can also be used, if desired. Such dispersants include, for example, sodium polyacrylate, sucrose fatty acid esters, glycerol esters of fatty acids, ammonium salts of acrylic acid-maleic acid copolymers, methacrylic acid-naphthoxypolyethylene glycol acrylate copolymers, ammonium salts of methacrylic acid-polyethylene glycol monomethacrylate copolymers, polyethylene glycol monoacrylate and the like. These can be used alone or as a combination of two or more of them. They may be added before or after the carbonation reaction. Such additives can be added preferably in an amount of 0.001 to 20%, more preferably 0.1 to 10% of magnesium hydroxide.

Fibers

In the present invention, magnesium carbonate microparticles are complexed with a fiber. The fiber forming part of the complexes is not specifically limited, and examples of fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; composite carbohydrate fibers such as chitin/chitosan fibers and alginate fibers and the like. Examples of cellulosic raw materials include pulp fibers (wood pulps and non-wood pulps), bacterial celluloses, animal-derived celluloses such as Ascidiacea, algae, etc., among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica*, poplars, *Fraxinus, Populus maximowiczii, Eucalyptus*, mangroves, Meranti, *Acacia* and mixed materials thereof.

The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching).

Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera, Edgeworthia chrysantha* and the like.

The pulp fibers may be unbeaten or beaten, and may be chosen depending on the properties of the complex sheets, but they are preferably beaten. This can be expected to improve the sheet strength and to promote the adhesion of magnesium carbonate.

Synthetic fibers include polyesters, polyamides, polyolefins, and acrylic fibers; semisynthetic fibers include rayon, acetate and the like; and inorganic fibers include glass fiber, carbon fiber, various metal fibers and the like.

Moreover, these cellulosic raw materials can be further treated so that they can also be used as powdered celluloses, chemically modified celluloses such as oxidized celluloses, and cellulose nanofibers (CNFs) (microfibrillated celluloses (MFCs), TEMPO-oxidized CNFs, phosphate esters of CNFs, carboxymethylated CNFs, mechanically ground CNFs and the like). Powdered celluloses used in the present invention may be, for example, rod-like crystalline cellulose powders having a certain particle size distribution prepared by purifying/drying and grinding/sieving the undecomposed residue obtained after acid hydrolysis of a cleaned pulp, or may be commercially available products such as KC FLOCK (from Nippon Paper Industries Co., Ltd.), CEOLUS (from Asahi Kasei Chemicals Corp.), AVICEL (from FMC Corporation) and the like. The degree of polymerization of celluloses in the powdered celluloses is preferably in the order of 100 to 1500, and the powdered celluloses preferably have a crystallinity of 70 to 90% as determined by X-ray diffraction and also preferably have a volume average particle size of 1 μm or more and 100 μm or less as determined by a laser diffraction particle size distribution analyzer. Oxidized celluloses used in the present invention can be obtained by oxidation with an oxidizing agent in water in the presence of an N-oxyl compound and a compound selected from the group consisting of a bromide, an iodide or a mixture thereof, for example. Cellulose nanofibers can be obtained by disintegrating the cellulosic raw materials described above. Disintegration methods that can be used include, for example, mechanically grinding or beating an aqueous suspension or the like of a cellulose or a chemically modified cellulose such as an oxidized cellulose using a refiner, high pressure homogenizer, grinder, single screw or multi-screw kneader, bead mill or the like. Cellulose nanofibers may be prepared by using one or a combination of the methods described above. The fiber diameter of the cellulose nanofibers thus prepared can be determined by electron microscopic observation or the like and falls within the range of, for example, 5 nm to 1000 nm, preferably 5 nm to 500 nm, more preferably 5 nm to 300 nm. During the preparation of the cellulose nanofibers, a given compound can be further added before and/or after the celluloses are disintegrated and/or micronized, whereby it reacts with the cellulose nanofibers to functionalize the hydroxyl groups. Functional groups used for the functionalization include acyl groups such as acetyl, ester, ether, ketone, formyl, benzoyl, acetal, hemiacetal, oxime, isonitrile, allene, thiol, urea, cyano, nitro, azo, aryl, aralkyl, amino, amide, imide, acryloyl, methacryloyl, propionyl, propioloyl, butyryl, 2-butyryl, pentanoyl, hexanoyl, heptanoyl, octanoyl, nonanoyl, decanoyl, undecanoyl, dodecanoyl, myristoyl, palmitoyl, stearoyl, pivaloyl, benzoyl, naphthoyl, nicotinoyl, isonicotinoyl, furoyl and cinnamoyl; isocyanate groups such as 2-methacryloyloxtyethyl isocyanoyl; alkyl groups such as methyl, ethyl, propyl, 2-propyl, butyl, 2-butyl, tert-butyl, pentyl, hexyl, heptyl, octyl, nonyl, decyl, undecyl, dodecyl, myristyl, palmityl, and stearyl; oxirane, oxetane, oxyl, thiirane, thietane and the like. Hydrogens in these substituents may be substituted by a functional group such as hydroxyl or carboxyl. Further, the alkyl groups may be partially unsaturated with an unsaturated bond. Compounds used for introducing these functional groups are not specifically limited and include, for example, compounds containing phosphate-derived groups, compounds containing carboxylate-derived groups, compounds containing sulfate-derived groups, compounds containing sulfonate-derived groups, compounds containing alkyl groups, compounds containing amine-derived groups and the like. Phosphate-containing compounds include, but not specifically limited to, phosphoric acid and lithium salts of phosphoric acid such as lithium dihydrogen phosphate, dilithium hydrogen phosphate, trilithium phosphate, lithium pyrophosphate, and lithium polyphosphate. Other examples include sodium salts of phosphoric acid such as sodium dihydrogen phosphate, disodium hydrogen phosphate, trisodium phosphate, sodium pyrophosphate, and sodium polyphosphate. Further examples include potassium salts of phosphoric acid such as potassium dihydrogen phosphate, dipotassium hydrogen phosphate, tripotassium phosphate, potassium pyrophosphate, and potassium polyphosphate. Still further examples include ammonium salts of phosphoric acid such as ammonium dihydrogen phosphate, diammonium hydrogen phosphate, triammonium phosphate, ammonium pyrophosphate, ammonium polyphosphate and the like. Among them, preferred ones include, but not specifically limited to, phosphoric acid, sodium salts of phosphoric acid, potassium salts of phosphoric acid, and ammonium salts of phosphoric acid, and more preferred are sodium dihydrogen phosphate and disodium hydrogen phosphate because they allow phosphate groups to be introduced with high efficiency so that they are convenient for industrial applications. Carboxyl-containing compounds include, but not specifically limited to, dicarboxylic compounds such as maleic acid, succinic acid, phthalic acid, fumaric acid, glutaric acid, adipic acid, and itaconic acid; and tricarboxylic compounds such as citric acid, and aconitic acid. Acid anhydrides of carboxyl-containing compounds include, but not specifically limited to, acid anhydrides of dicarboxylic compounds such as maleic anhydride, succinic anhydride, phthalic anhydride, glutaric anhydride, adipic anhydride, and itaconic anhydride. Derivatives of carboxyl-containing compounds include, but not specifically limited to, imides of acid anhydrides of carboxyl-containing compounds, and derivatives of acid anhydrides of carboxyl-containing compounds. Imides of acid anhydrides of carboxyl-containing compounds include, but not specifically limited to, imides of dicarboxylic compounds such as maleimide, succinimide, and phthalimide. Derivatives of acid anhydrides of carboxyl-containing compounds are not specifically limited. For example, they include acid anhydrides of carboxyl-containing compounds in which hydrogen atoms are at least partially substituted by a substituent (e.g., alkyl, phenyl or the like) such as dimethylmaleic anhydride, diethylmaleic anhydride, and diphenylmaleic anhydride. Among the compounds containing carboxylate-derived groups listed above, preferred ones include, but not specifically limited to, maleic anhydride, succinic anhydride and phthalic anhydride because they are convenient for industrial applications and can be readily gasified. Further, these compounds may be physically adsorbed rather than chemically bonded to the cellulose nanofibers to functionalize the cellulose nanofibers. Physically adsorbed compounds include surfactants, which may be anionic, cationic, or nonionic. When celluloses are functionalized as described above before they are disintegrated and/or ground, these functional groups can be removed, giving back the original hydroxyl groups after they are disintegrated and/or ground. The functionalization as described above can promote disintegration into cellulose nanofibers or help cellulose nanofibers to be mixed with various materials during use.

The fibers shown above may be used alone or as a mixture of two or more of them. Especially, the complexes preferably comprise a wood pulp or a combination of a wood pulp and a non-wood pulp and/or a synthetic fiber, more preferably a wood pulp alone.

In preferred embodiments, the fiber forming part of the complexes of the present invention is a pulp fiber. Alternatively, fibrous materials collected from waste water of papermaking factories may be supplied to the carbonation reaction of the present invention, for example. Various composite particles including those of various shapes such as fibrous particles can be synthesized by supplying such materials to the reaction vessel.

In the present invention, materials that are not directly involved in the carbonation reaction but incorporated into the product magnesium carbonate to form composite particles can be used in addition to a fiber. In the present invention, composite particles incorporating inorganic particles, organic particles, polymers or the like in addition to a fiber such as a pulp fiber can be prepared by synthesizing a magnesium carbonate in a solution further containing these materials.

Reaction Conditions

In the present invention, the conditions of the carbonation reaction are not specifically limited, and appropriately selected depending on the purposes. For example, the temperature of the reaction by which magnesium bicarbonate or a basic magnesium carbonate is obtained from magnesium hydroxide can be 0 to 90° C., preferably 10 to 70° C. The reaction temperature may be at least 20° C. and at most 80° C. The reaction temperature can be controlled by regulating the temperature of the reaction solution using a temperature controller, and if the temperature is low, the reaction efficiency decreases or the conversion may not proceed until a basic magnesium carbonate is obtained. If it exceeds 90° C., however, heating costs may increase or the workability may decrease and coarse particles tend to increase.

Further in the present invention, the carbonation reaction can be a batch reaction or a continuous reaction. Typically, the reaction is preferably performed as a batch process because of the convenience in removing residues after the reaction. The scale of the reaction is not specifically limited, and can be 100 L or less, or more than 100 L. The volume of the reaction vessel can be, for example, in the order of 10 L to 100 L, or may be in the order of 100 L to 1000 L.

Further, the carbonation reaction can be controlled by monitoring the pH of the reaction suspension, and the carbonation reaction can be performed until the pH reaches, for example, less than pH 9, preferably less than pH 8.5, more preferably less than pH 8.3, even around less than pH 8.0 depending on the pH profile of the reaction suspension. In cases where a complex of a fiber and a basic magnesium carbonate is prepared, the carbonation reaction is desirably performed until the pH reaches 7 to 7.5.

Alternatively, the carbonation reaction can be controlled by monitoring the conductivity of the reaction solution. The carbonation reaction is preferably performed until the conductivity increases to 4 mS/cm or more (400 mS/m or more).

In the present invention, the reaction solution can be aged after the carbonation reaction has been completed. Specifically, the injection of carbonic acid gas is stopped after the completion of the carbonation reaction has been confirmed by a change in pH or conductivity as described above, and then an aging period can be provided using a given temperature or stirring means. The temperature during aging can be, for example, 20 to 90° C., preferably 40 to 90° C., more preferably 60 to 90° C. The aging period can be, for example, 1 minutes or more, preferably 15 minutes or more, more preferably 30 minutes or more. Further, this aging reaction can be performed directly in the reaction vessel used for the carbonation reaction, or can be performed in another reaction vessel. When aging takes place in another reaction vessel, the shape of the reaction vessel and the stirring means are not specifically limited. Further, cavitation can also be generated during this aging reaction, which can be expected to further promote the adhesion of magnesium carbonate to fibers.

Furthermore, the carbonation reaction can also be controlled by the reaction period, and specifically it can be controlled by adjusting the period during which the reactants stay in the reaction vessel. Additionally, the reaction can also be controlled in the present invention by stirring the reaction solution in the carbonation reactor or performing the carbonation reaction as a multistage reaction.

In the present invention, the reaction product complex is obtained as a suspension so that it can be stored in a storage tank or subjected to processing such as concentration, dehydration, grinding, classification, aging, or dispersion, as appropriate. These can be accomplished by known processes, which may be appropriately selected taking into account the purposes, energy efficiency and the like. For example, the concentration/dehydration process is performed by using a centrifugal dehydrator, thickener or the like. Examples of such centrifugal dehydrators include decanters, screw decanters and the like. If a filter or dehydrator is used, the type of it is not specifically limited either, and those commonly used can be used, including, for example, pressure dehydrators such as filter presses, drum filters, belt presses and tube presses or vacuum drum filters such as Oliver filters or the like, which can be suitably used to give a cake. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, breakers, beaters, single screw extruders, twin screw extruders, ultrasonic stirrers, juicers/mixers for home use, etc. Classification means include sieves such as meshes, outward or inward flow slotted or round-hole screens, vibrating screens, heavyweight contaminant cleaners, lightweight contaminant cleaners, reverse cleaners, screening testers and the like. Dispersion means include high speed dispersers, low speed kneaders and the like.

The complexes obtained by the present invention can be compounded into fillers or pigments as a suspension without being completely dehydrated, or can be dried into powders. The dryer used in the latter case is not specifically limited either, but air-flow dryers, band dryers, spray dryers and the like can be suitably used, for example.

The complexes obtained by the present invention can be modified by known methods. In one embodiment, for example, they can be hydrophobized on their surfaces to enhance the miscibility with resins or the like.

Molded Products of the Complexes

The complexes of the present invention can be used to prepare molded products, as appropriate. For example, products having a high ash content can be readily obtained when they contain the complexes obtained by the present invention. Especially, the complexes obtained by the present invention can be readily formed into sheets having a high ash content. Paper machines (sheet-forming machines) used for preparing sheets include, for example, Fourdrinier machines, cylinder machines, gap formers, hybrid formers, multilayer paper machines, known sheet-forming machines combining the papermaking methods of these machines and the like. The linear pressure in the press section of the paper machines and the linear calendering pressure in a subsequent optional calendering process can be both selected within a range convenient for the runnability and the performance of the complex sheets. Further, the sheets thus formed may be impregnated or coated with starches, various polymers, pigments and mixtures thereof.

During sheet forming, wet and/or dry strength additives (paper strength additives) can be added. This allows the strength of the complex sheets to be improved. Strength additives include, for example, resins such as urea-formaldehyde resins, melamine-formaldehyde resins, polyamides, polyamines, epichlorohydrin resins, vegetable gums, latexes, polyethylene imines, glyoxal, gums, mannogalactan polyethylene imines, polyacrylamide resins, polyvinylamines, and polyvinyl alcohols; composite polymers or copolymers composed of two or more members selected from the resins listed above; starches and processed starches; carboxymethylcellulose, guar gum, urea resins and the like. The amount of the strength additives to be added is not specifically limited.

Further, high molecular weight polymers or inorganic materials can be added to promote the adhesion of fillers to fibers or to improve the retention of fillers or fibers. For example, coagulants can be added, including cationic polymers such as polyethylene imines and modified polyethylene imines containing a tertiary and/or quaternary ammonium group, polyalkylene imines, dicyandiamide polymers, polyamines, polyamine/epichlorohydrin polymers, polymers of dialkyldiallyl quaternary ammonium monomers, dialkylaminoalkyl acrylates, dialkylaminoalkyl methacrylates, dialkylaminoalkyl acrylamides and dialkylaminoalkyl methacrylamides with acrylamides, monoamine/epihalohydrin polymers, polyvinylamines and polymers containing a vinylamine moiety as well as mixtures thereof; cation-rich zwitterionic polymers containing an anionic group such as a carboxyl or sulfone group copolymerized in the molecules of the polymers listed above; mixtures of a cationic polymer and an anionic or zwitterionic polymer and the like. Further, retention aids such as cationic or anionic or zwitterionic polyacrylamide-based materials can be used. These may be applied as retention systems called dual polymers in combination with at least one or more cationic or anionic polymers or may be applied as multicomponent retention systems in combination with at least one or more anionic inorganic microparticles such as bentonite, colloidal silica, polysilicic acid, microgels of polysilicic acid or polysilicic acid salts and aluminum-modified products thereof or one or more organic microparticles having a particle size of 100 μm or less called micropolymers composed of crosslinked/polymerized acrylamides. Especially when the polyacrylamide-based materials used alone or in combination with other materials have a weight-average molecular weight of 2,000,000 Da or more, preferably 5,000,000 Da or more as determined by intrinsic viscosity measurement, good retention can be achieved, and when the acrylamide-based materials have a molecular weight of 10,000,000 Da or more and less than 30,000,000 Da, very high retention can be achieved. The polyacrylamide-based materials may be emulsions or solutions. Specific compositions of such materials are not specifically limited so far as they contain an acrylamide monomer unit as a structural unit therein, but include, for example, copolymers of a quaternary ammonium salt of an acrylate ester and an acrylamide, or ammonium salts obtained by copolymerizing an acrylamide and an acrylate ester and then quaternarizing the copolymer. The cationic charge density of the cationic polyacrylamide-based materials is not specifically limited.

Other additives include freeness improvers, internal sizing agents, pH modifiers, antifoaming agents, pitch control agents, slime control agents, bulking agents, inorganic particles (the so-called fillers) such as calcium carbonate, kaolin, talc and silica and the like depending on the purposes. The amount of these additives to be used is not specifically limited.

Molding techniques other than sheet forming may also be used, and molded products having various shapes can be obtained by the so-called pulp molding process involving casting a raw material into a mold and then dewatering by suction and drying it or the process involving spreading a raw material over the surface of a molded product of a resin or metal or the like and drying it, and then releasing the dried material from the substrate or other processes. Further, the complexes can be molded like plastics by mixing them with resins, or can be molded like ceramics by calcining them with minerals such as silica or alumina. In the compounding/drying/molding steps shown above, only one complex can be used, or a mixture of two or more complexes can be used. Two or more complexes can be used as a premixture of them or can be mixed after they have been individually compounded, dried and molded.

Further, various organic materials such as polymers or various inorganic materials such as pigments may be added later to molded products of the complexes.

EXAMPLES

The following examples further illustrate the present invention, but the present invention is not limited to these examples. Unless otherwise specified, the concentrations, parts and the like as used herein are based on weight, and the numerical ranges are described to include their endpoints.

Experiment 1

Synthesis of Complexes of Magnesium Carbonate Microparticles and a Fiber

Figure 2:
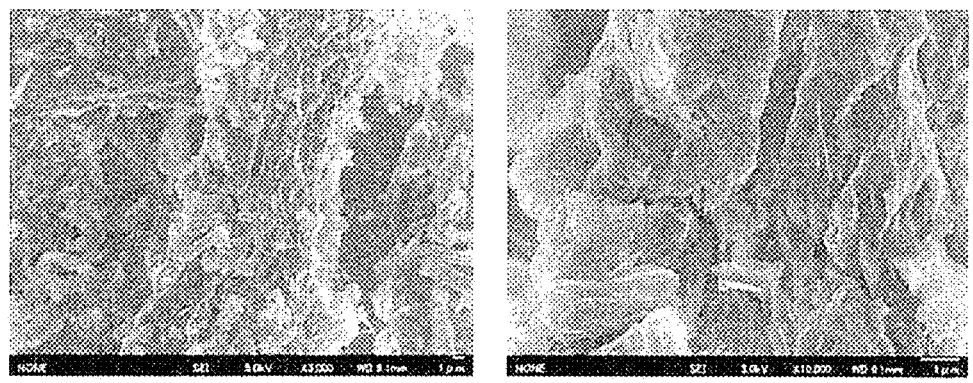
FIG. 2 shows electron micrographs of the complex of magnesium carbonate microparticles and a fiber (LBKP) synthesized in Experiment 1-1 (magnification: left 3000×, right 10000×).

<Experiment 1-1 (FIG. 2)>

An aqueous suspension containing 140 g of magnesium hydroxide (from Wako Pure Chemical Industries, Ltd.) and 140 g of a hardwood bleached kraft pulp (LBKP, CSF: 370 ml, average fiber length: 0.75 mm) was provided. A 45-L cavitation system was charged with 14 L of this aqueous suspension and carbonic acid gas was injected into the reaction vessel while circulating the reaction solution to synthesize a complex of magnesium carbonate microparticles and a fiber by the carbonation process. The reaction temperature was about 36° C., the carbonic acid gas source was a commercially available liquefied gas, and the injection flow rate of the carbonic acid gas was 4 L/min. When the pH of the reaction solution reached about 8 (pH 7.8) (from the pH of about 9.5 before the reaction), the injection of $CO_2$ was stopped, after which the generation of cavitation and the circulation of the slurry within the system were continued for 30 minutes to give Sample 1-1.

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

Figure 3:
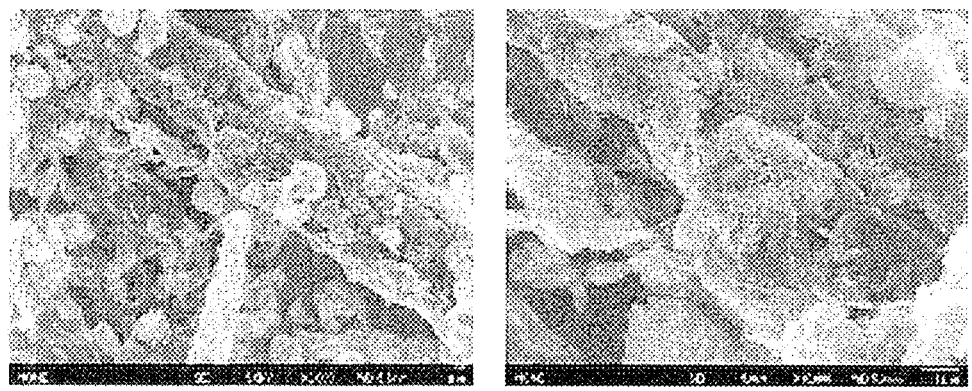
FIG. 3 shows electron micrographs of the complex of magnesium carbonate microparticles and a fiber (LBKP) synthesized in Experiment 1-2 (magnification: left 3000×, right 10000×).

<Experiment 1-2 (FIG. 3)>

A complex of a magnesium carbonate and a fiber was synthesized in the same manner as in Experiment 1-1 except that immediately after the injection of carbonic acid gas was stopped in Experiment 1-1, the reaction solution was transferred into a hot bath at 70° C. and stirred with a stirrer in the absence of cavitation for 30 minutes (Sample 1-2).

Figure 4:
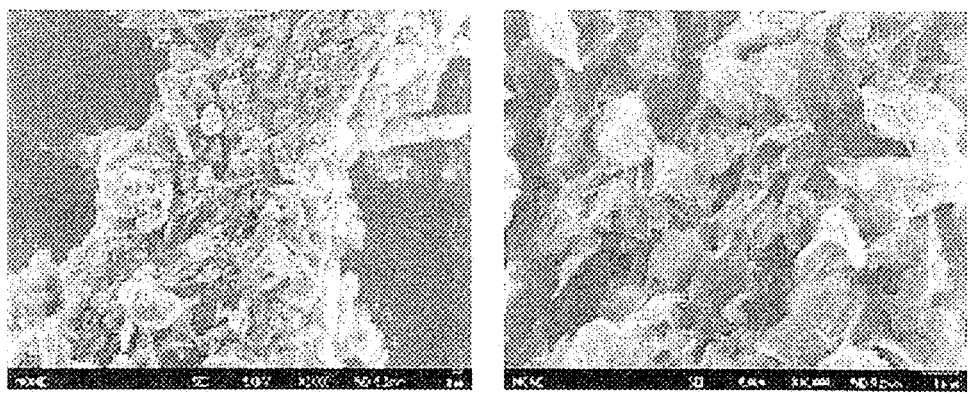
FIG. 4 shows electron micrographs of the complex of magnesium carbonate microparticles and a fiber (LBKP) synthesized in Experiment 1-3 (magnification: left 3000×, right 10000×).

<Experiment 1-3 (FIG. 4)>

This experiment was performed in the same manner as in Experiment 1-2 except that a 3-L stainless steel vessel was used as a reaction vessel and charged with 20 g of the pulp, carbonic acid gas was injected at 0.57 L/min, and the carbonation reaction was performed in a water bath at 35° C. with stirring using a Three-One Motor agitator (800 rpm) (Sample 1-3).

Figure 5:
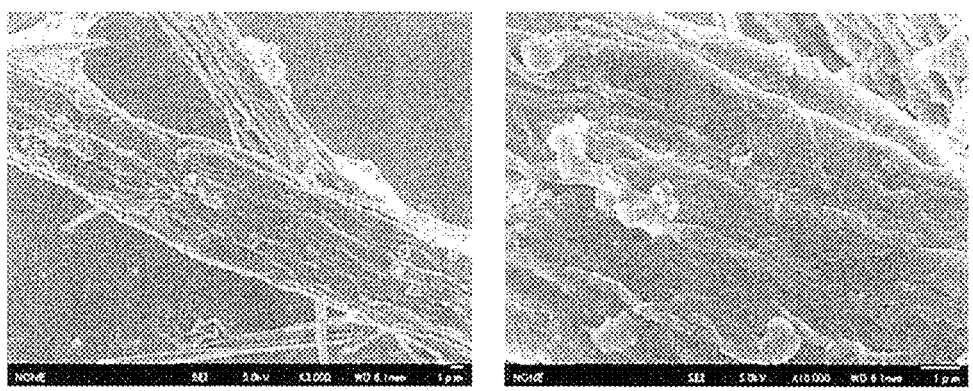
FIG. 5 shows electron micrographs of the complex of magnesium carbonate microparticles and a fiber (LBKP) synthesized in Experiment 1-4 (magnification: left 3000×, right 10000×).

<Experiment 1-4 (FIG. 5)>

A complex of a magnesium carbonate and a fiber was synthesized in the same manner as in Experiment 1-1 except that the inlet pressure was 1.8 MPa (Sample 1-4).

Figure 6:
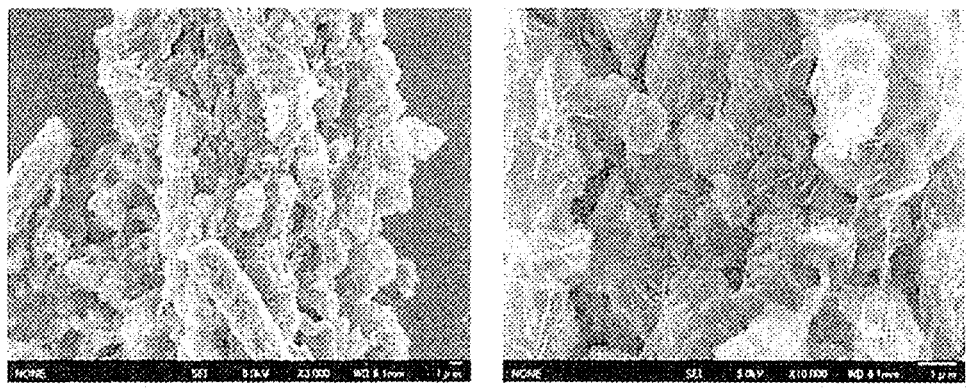
FIG. 6 shows electron micrographs of the complex of magnesium carbonate microparticles and a fiber (LBKP) synthesized in Experiment 1-5 (magnification: left 3000×, right 10000×).

<Experiment 1-5 (FIG. 6)>

Magnesium carbonate was synthesized in the same manner as in Experiment 1-2 except that the inlet pressure was 1.8 MPa (Sample 1-5).

Figure 7:
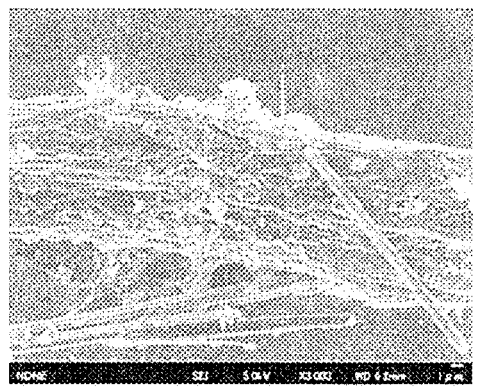
FIG. 7 shows electron micrographs of the complex of magnesium carbonate microparticles and a fiber (LBKP) synthesized in Experiment 1-6 (magnification: left 3000×, right 10000×).
Figure 7:
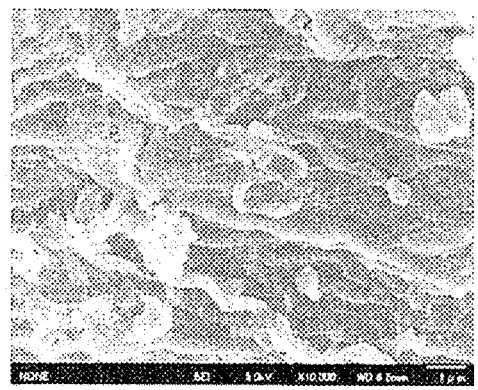

<Experiment 1-6 (FIG. 7)>

This experiment was performed in the same manner as in Experiment 1-4 except that sodium hydroxide (150 mL of a 0.4 mol solution) was added into the reaction solution instead of continuing cavitation for 30 minutes after the injection of carbonic acid gas was stopped (Sample 1-6).

Figure 8:
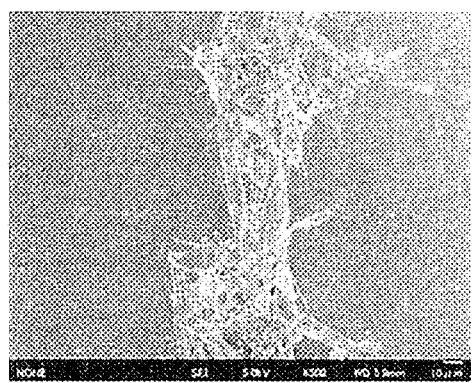
FIG. 8 shows electron micrographs of the complex of magnesium carbonate microparticles and a fiber (LBKP) synthesized in Experiment 1-7 (magnification: left 500×, right 3000×).
Figure 8:
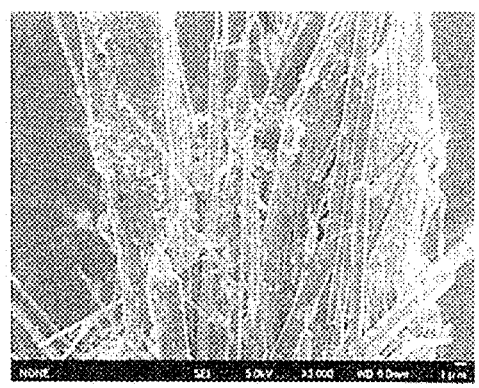

<Experiment 1-7 (FIG. 8)>

A complex of a magnesium carbonate and a fiber was synthesized in the same manner as in Experiment 1-1 except that the reaction solution was not aged after the injection of carbonic acid gas was stopped (Sample 1-7).

Figure 9:
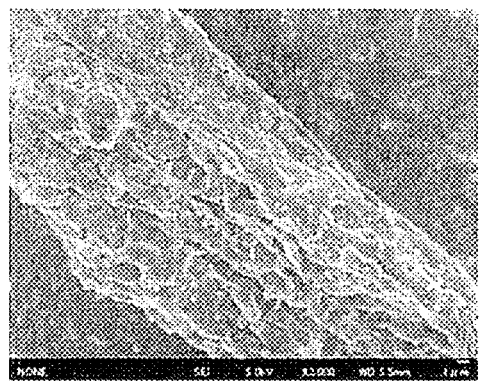
FIG. 9 shows electron micrographs of the complex of magnesium carbonate microparticles and a fiber (LBKP) synthesized in Experiment 1-8 (magnification: left 3000×, right 10000×).
Figure 9:
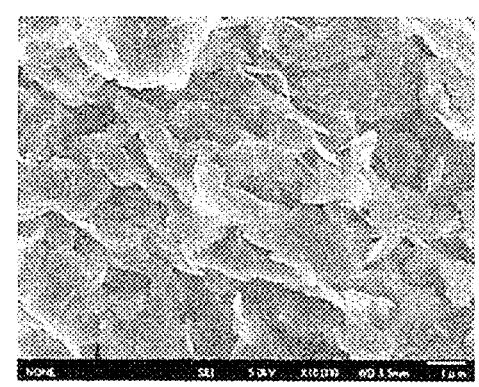

<Experiment 1-8 (FIG. 9)>

A complex of a magnesium carbonate and a fiber was synthesized in the same manner as in Experiment 1-4 except that the reaction was started at a temperature of 50° C. (Sample 1-8).

<Experiment 1-9 (Surface Modification)>

To a slurry of Sample 1-1 (concentration 2.5%, 100 mL) was added sodium oleate (0.15 g) dissolved in hot water (10 mL) at 90° C., and the mixture was stirred using a laboratory mixer for 5 minutes to hydrophobize the particle surfaces (Sample 1-9).

<Evaluation of the Complexes>

Electron micrographs of the complexes obtained are shown in FIGS. 2 to 9. As seen from the figures, many magnesium carbonate particles were deposited on the fiber surface in all cases. The primary particles of magnesium carbonate were mostly flaky, and had a primary particle size (major axis diameter) in the order of 0.1 to 3 μm. Especially in Experimental example 1-1, the entire fiber surface was covered by not only the flaky crystals but also amorphous magnesium carbonate, and spherical secondary aggregates were fewer as compared with Experimental example 1-2 and Experimental example 1-3. In Experiments 1-4, 1-6 and 1-7, columnar crystals in the order of 1 to 2 μm in width and 10 to 30 μm in length were deposited, which seemed to be crystals of normal magnesium carbonate. These results indicated that basic magnesium carbonate is produced more efficiently and complexed with a fiber more sufficiently by starting the reaction at a relatively high temperature (45° C. or more) or providing an aging period at a high temperature of 50° C. or more after the completion of the reaction. It seemed that spherical secondary aggregates represent basic magnesium carbonate, while columnar crystals represent normal magnesium carbonate.

The reaction solutions containing the complexes were filtered through a filter paper under suction and observed, showing that the complexes of a fiber and magnesium carbonate microparticles stably existed and that the magnesium carbonate microparticles did not drop from the fiber.

Further, the ash contents of these complexes were determined to be 29.6% by weight of the complexes, which approximately coincided with the theoretical value 28.3% by weight calculated from the initial ratio of the starting materials (a pulp and calcium hydroxide). The ash content of each complex here was calculated from the ratio between the weight of ash remaining after the complex was heated at 525° C. for about 2 hours and the original solids content (JIS P 8251: 2003).

Further, Sample 1-9 obtained in Experiment 1-9 was tested as follows: after the reaction, the slurry was spread over a cover glass and dried, and then the contact angle was measured using a dynamic contact angle tester (1100DAT from Fibro System AB) at 0.1 second after a water drop was placed. The contact angle was 0° before sodium oleate was added, but it was 147° after sodium oleate was added, thus confirming that the surface of the magnesium carbonate has been hydrophobized.

Experiment 2

Preparation and Evaluation of Complex Sheets

The complexes prepared in Experiment 1 (Sample 1-1 to Sample 1-6) were formed into sheets by the following procedure (Samples 1 to 6).

A slurry of each complex (about 0.5%) was stirred with 100 ppm of a cationic retention aid (ND300 from HYMO CORPORATION) and 100 ppm of an anionic retention aid (FA230 from HYMO CORPORATION) at 500 rpm to prepare a suspension. A complex sheet having a basis weight of about 60 g/m² was prepared from the resulting suspension according to JIS P 8222. A complex sheet having a basis weight of about 60 g/m² was also prepared from the slurry of each complex according to JIS P 8222 without using retention aids.

For reference, a sheet having a basis weight of about 60 g/m² was prepared from the LBKP (CSF: 370 ml) used in Experiment 1.

<Evaluation of the Sheets>

Basis weight: JIS P 8124: 1998

Thickness: JIS P 8118: 1998

Density: calculated from the measured thickness and basis weight

Ash content: JIS P 8251: 2003

Brightness: JIS P 8212: 1998

Opacity: JIS P 8149: 2000

Specific scattering coefficient: calculated by the equation defined in TAPPI T425 (ISO 9416)

Air resistance: JIS P8117: 2009

Smoothness: JIS P 8155: 2010

Smoothness: JIS P 8155: 2010

L&W bending stiffness: The bending stiffness was measured at a bending angle of 15° according to ISO-2493 using L&W Bending Tester Cord (from Lorentzen & Wettre)

Breaking length: JIS P 8113: 2006.

TABLE 1

| | | Sample 1 (FIG. 8) | | Sample 2 (FIG. 9) | | Sample 3 (FIG. 10) | | Sample 4 | | Sample 5 | | Sample 6 | | LBKP alone |
|---|---|---|---|---|---|---|---|---|---|---|---|---|---|---|
| Retention aids | | Yes | No | Yes | No | Yes | No | Yes | No | Yes | No | Yes | No | Yes |
| Basis weight | g/m$^2$ | 64.1 | 63.9 | 63.3 | 65.4 | 64.2 | 67.2 | 64.9 | 67.4 | 68.2 | 74.3 | 67.2 | 68.1 | 64.5 |
| Thickness | μm | 134 | 134 | 115 | 117 | 127 | 135 | 150 | 159 | 129 | 140 | 155 | 160 | 116 |
| Density | g/m3 | 0.48 | 0.48 | 0.55 | 0.56 | 0.51 | 0.50 | 0.43 | 0.42 | 0.53 | 0.53 | 0.44 | 0.43 | 0.56 |
| Ash content | % | 51.6 | 50.5 | 48.7 | 42.4 | 46.2 | 34.1 | 48.9 | 40.5 | 43.1 | 38.7 | 49.3 | 40.8 | 0.5 |
| Brightness | | 92.9 | 92.6 | 92.5 | 92.4 | 92.8 | 91.8 | 91.2 | 90.8 | 93.2 | 93.1 | 92.4 | 92.0 | 83.2 |
| Opacity | | 93.7 | 93.5 | 92.3 | 91.7 | 92.1 | 89.4 | 91.4 | 89.6 | 93.7 | 93.6 | 92.4 | 90.1 | 77.3 |
| Specific scattering coefficient | m2/kg | 136 | 134 | 119 | 108 | 117 | 90 | 100 | 82 | 129 | 118 | 110 | 87 | 36 |
| Smoothness | sec | 5 | 5 | 6 | 5 | 6 | 6 | 4 | 3 | 5 | 5 | 4 | 4 | 5 |
| Air resistance | sec | 232 | 322 | 391 | 402 | 66 | 13 | 5 | 2 | 242 | 191 | 16 | 5 | 6 |
| Breaking length | km | 1.6 | 1.8 | 1.7 | 2.0 | 1.0 | 1.2 | 0.7 | 0.8 | 1.1 | 1.2 | 0.7 | 0.8 | 4.9 |
| L&W bending stiffness | μN · m | 160 | 145 | 139 | 120 | 117 | 152 | 87 | 110 | 133 | 169 | 93 | 96 | 181 |
| Ash retention (approximation) | | 94% | 92% | 89% | 77% | 84% | 62% | 89% | 74% | 81% | 73% | 75% | 62% | — |

The properties of the resulting sheets are shown in the table. Sheets having a high ash content of 50% or more could be readily prepared by using the complexes. Especially when Sample 1-1 was used, the ash retention was very high despite the fact that any chemicals such as retention aids were not added (Sample 1, ash retention: 92%).

Figure 10:
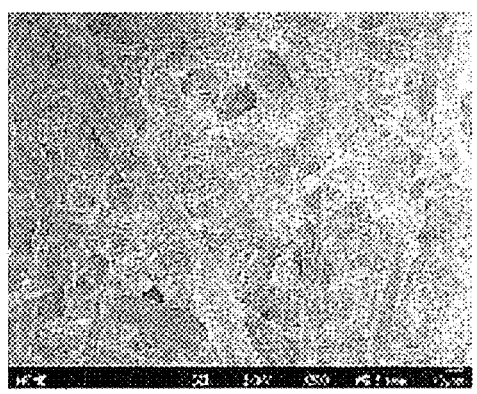
FIG. 10 shows electron micrographs of Sample 1 prepared in Experiment 2 (magnification: 500×; left: with retention aids; right: without retention aids).
Figure 10:
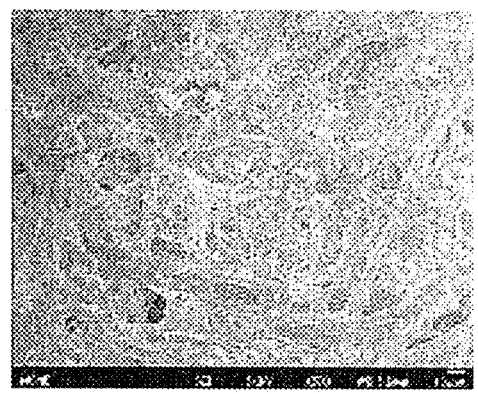
Figure 11:
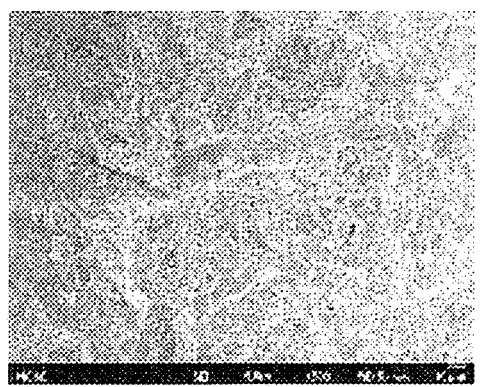
FIG. 11 shows electron micrographs of Sample 2 prepared in Experiment 2 (magnification: 500×; left: with retention aids; right: without retention aids).
Figure 11:
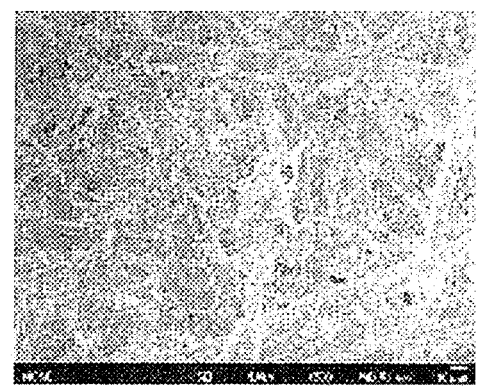
Figure 12:
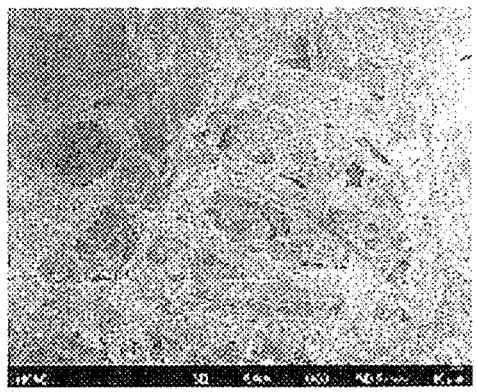
FIG. 12 shows electron micrographs of Sample 3 prepared in Experiment 2 (magnification: 500×; left: with retention aids; right: without retention aids).
Figure 12:
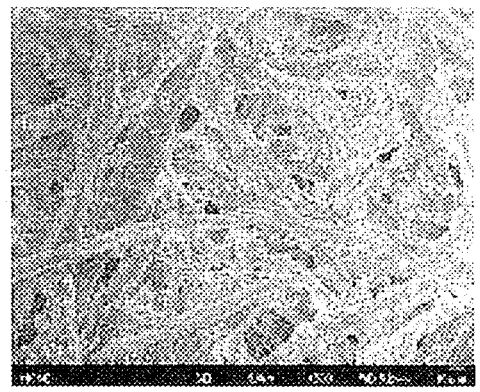

Images taken during observation by electron microscopy (SEM) are shown in FIGS. 10 to 12. Regardless of whether or not retention aids were added, little voids were observed in the sheet prepared from Sample 1-1 (Sample 1, FIG. 10) and the sheet prepared from Sample 1-2 (Sample 2, FIG. 11). However, many voids were observed and some parts of the fiber were not covered with magnesium carbonate on the surface in the sheet prepared from Sample 1-3 (Sample 3, FIG. 12).

Experiment 3

Synthesis of Magnesium Carbonate Particles

<Experiment 3-1 (FIG. 13)>

Magnesium carbonate particles were synthesized in the same manner as in Experiment 1-1 except that no fiber was added.

<Experiment 3-2 (FIG. 14)>

Magnesium carbonate particles were synthesized in the same manner as in Experiment 1-2 except that no fiber was added.

<Experiment 3-3 (FIG. 15)>

Magnesium carbonate particles were synthesized in the same manner as in Experiment 1-3 except that no fiber was added.

<Evaluation of the Magnesium Carbonate Particles>

Figure 13:
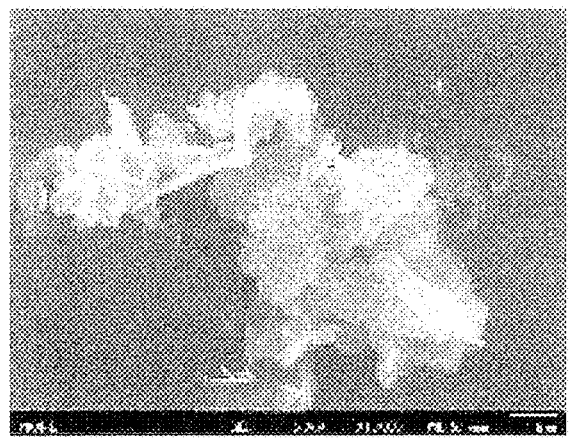
FIG. 13 shows an electron micrograph of the magnesium carbonate particles synthesized in Experiment 3-1 (magnification: 10000×).
Figure 14:
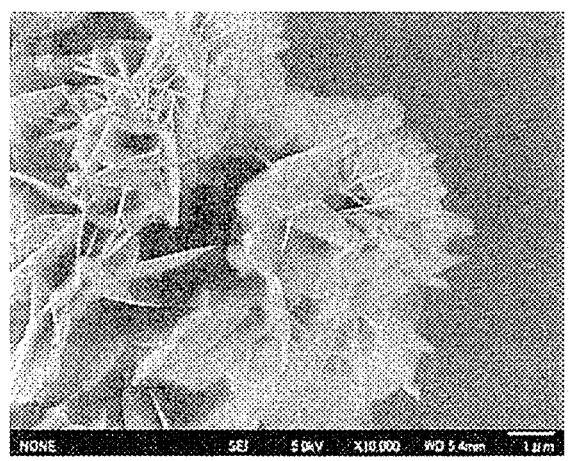
FIG. 14 shows an electron micrograph of the magnesium carbonate particles synthesized in Experiment 3-2 (magnification: 10000×).
Figure 15:
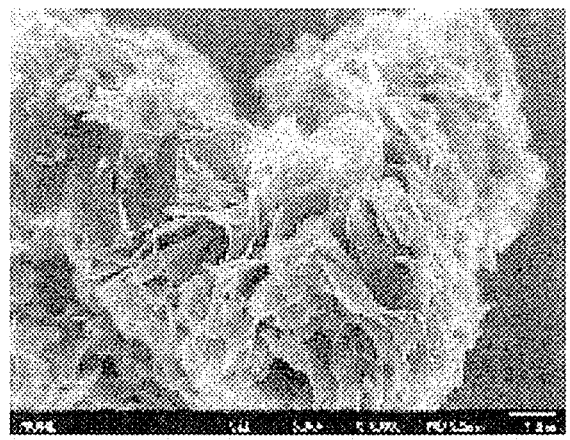
FIG. 15 shows an electron micrograph of the magnesium carbonate particles synthesized in Experiment 3-3 (magnification: 10000×).

Electron micrographs of the magnesium carbonates obtained are shown in FIGS. 13 to 15 (magnification: 10000×). In all cases, the primary particles were mostly flaky, and the primary particle size (major axis diameter) was in the order of 0.1 to 2.5 μm. In all cases, the primary particles aggregated to form secondary particles, but the particles of Experiment 3-1 seemed to aggregate more loosely than the others. The average particle sizes of the secondary particles measured by a laser diffraction particle size distribution analyzer (Mastersizer 3000 from Malvern) were 6.5 μm in Experiment 3-1, 30.4 μm in Experiment 3-2, and 29.6 μm in Experiment 3-3.

Experiment 4

Preparation of Sheets From Complexes of Magnesium Carbonate Microparticles and a Fiber The complex of Experiment 1-1 (Sample 1-1), the magnesium carbonate of Experiment 3-1, and LBKP (CSF: 460 ml) were used to prepare sheets having a basis weight of about 60 g/m$^2$ by the following procedure. It should be noted that the retention aids were added to all sheets.

1: A complex sheet was prepared in the same manner as Sheet 1 of Experiment 2.

2: A sheet was prepared in the same manner as #1 except that a slurry prepared by adding the magnesium carbonate of Experiment 3-1 to LBKP (CSF=460 ml) was used as a starting material (ash content: about 58%).

3: A sheet was prepared in the same manner as #1 except that a slurry prepared by adding the magnesium carbonate of Experiment 3-1 to a slurry of the complex of Experiment 1-1 was used as a starting material (ash content: about 87%).

4: A sheet was prepared in the same manner as #2 except that LBKP was used alone as a starting material.

5: A sheet was prepared in the same manner as #2 except that precipitated calcium carbonate microparticles (PCC 1, average particle size: about 100 nm, cubic particles) were used as a filler in place of the magnesium carbonate.

6: A sheet was prepared in the same manner as #2 except that precipitated calcium carbonate microparticles (PCC 2, average particle size: about 3.5 μm, scalenohedral type) were used as a filler in place of the magnesium carbonate.

TABLE 2

| | | Sample #1 | Sample #2 | Sample #3 | Sample #4 | Sample #5 | Sample #6 |
|---|---|---|---|---|---|---|---|
| Pulp | | Sample 1-1 | LBKP | Sample 1-1 | LBKP | LBKP | LBKP |
| Inorganic particles | | (Complex) | Sample 3-1 (Mg carbonate) | Sample 3-1 (Mg carbonate) | — | PCC1 (100 nm) | PCC2 (3.5 μm) |
| Basis weight | g/m$^2$ | 63.1 | 63.7 | 71.4 | 65.1 | 62.4 | 64.8 |
| Density | g/cm3 | 0.43 | 0.47 | 0.45 | 0.53 | 0.62 | 0.51 |
| Ash content | % | 51.1 | 58.0 | 86.9 | 0.8 | 44.2 | 49.9 |
| Brightness | % | 93.4 | 93.7 | 95.6 | 84.5 | 88.8 | 92.7 |
| Opacity | % | 95.4 | 95.1 | 97.3 | 79.2 | 81.7 | 91.6 |
| Specific scattering coefficient | m2/kg | 167.9 | 161.8 | 235.0 | 40.5 | 49.6 | 110.4 |
| Smoothness | sec | 5 | 8 | 7 | 6 | 8 | 15 |
| Air resistance | sec | 259 | 322 | 796 | 2 | 8 | 2 |
| Breaking length | km | 1.4 | 0.9 | 0.6 | 4.8 | 1.5 | 0.9 |
| Bending stiffness | μN · m | 141 | 96 | 112 | 160 | 57 | 50 |
| Ash retention (approximation) | | 95% | 17% | 30% | — | 83% | 70% |

The properties of the resulting sheets were evaluated in the same manner as in Experiment 2 and the results are shown in the table. The sheets #1 to 3 containing magnesium carbonate showed higher brightness, opacity, air resistance and bending stiffness and lower density as compared with the sheet prepared from LBKP alone (#4) and the sheets internally containing precipitated calcium carbonate (#5 and #6). Especially, the complex sheet #1 was bulky and showed higher bending stiffness and breaking length as compared with #2 internally containing magnesium carbonate. In addition, #1 prepared by using a complex as a starting material showed a very high ash retention, but #2 internally containing magnesium carbonate showed an ash retention as low as about 17%.

Figure 16:
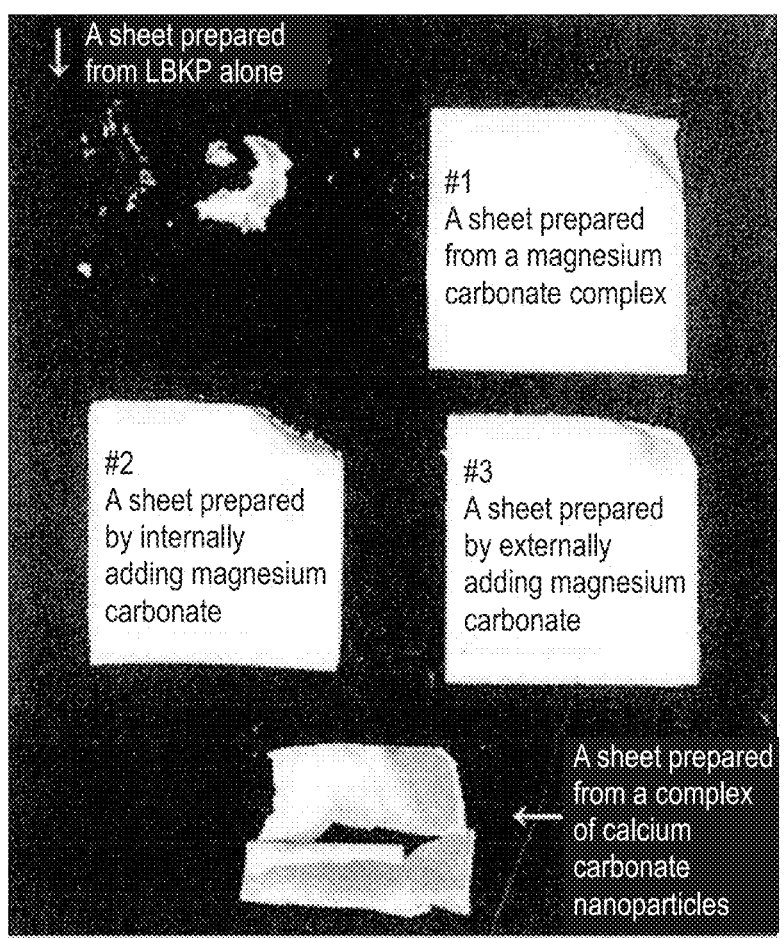
FIG. 16 is a photograph showing the appearance of the sheets of Experiment 4 after they have undergone a fire resistance test.

Further, a corner of each sheet was exposed to flame from a burner for about 2 seconds to evaluate the fire resistance of the sheet. The sheet prepared from LBKP alone (#4) burned away quickly, but the sheets containing magnesium carbonate resisted the spread of fire and showed self-extinguishing properties though they burned slightly. On the other hand, the sheet prepared from a complex of a calcium carbonate and a fiber (#5) was more resistant to the spread of fire than the sheet prepared from LBKP alone (#4), but it finally burned away (FIG. 16).

The invention claimed is:

1. A complex of magnesium carbonate particles having an average particle size of 50 μm or less and a fiber, wherein 15% or more of the surface of the fiber is covered with the magnesium carbonate particles, and the magnesium carbonate is a basic magnesium carbonate.

2. The complex of claim 1, wherein the fiber is a pulp fiber.

3. The complex of claim 1, wherein the weight ratio between the magnesium carbonate particles and the fiber is 5:95 to 95:5.

4. The complex of claim 1, wherein the magnesium carbonate particles are adhered to the surface of the fibers.

5. A product comprising the complex of claim 1.

6. The product of claim 5, which is in the form of a sheet.

7. A process for preparing a complex of magnesium carbonate particles and a fiber as defined in claim 1, comprising synthesizing the magnesium carbonate in a solution containing the fiber.

8. The process of claim 7, wherein the magnesium carbonate particles have an average particle size of 50 μm or less.

9. The process of claim 7, comprising synthesizing the magnesium carbonate from magnesium hydroxide.

10. The process of claim 7, comprising synthesizing the magnesium carbonate by injecting an aqueous suspension containing magnesium hydroxide into a reaction vessel.

11. The process of claim 7, comprising synthesizing the magnesium carbonate in the presence of cavitation bubbles.

12. The process of claim 7, comprising reacting an aqueous suspension of the starting material and a gas containing carbon dioxide in the presence of cavitation bubbles.

13. The process of claim 7, wherein the cavitation bubbles are generated by injecting a liquid into a reaction vessel.

14. The process of claim 7, wherein the fiber is a pulp fiber.

15. The process of claim 7, wherein the cavitation bubbles are generated by injecting an aqueous suspension containing magnesium hydroxide into a reaction vessel.

16. The process of claim 7, wherein the reaction solution circulated from the reaction vessel is used as the aqueous suspension.

17. The process of claim 7, wherein the magnesium carbonate has a primary particle size of 10 nm to 3 μm.

18. The process of claim 7, wherein the weight ratio between the magnesium carbonate and the fiber is 5:95 to 95:5.

19. The process of claim 7, wherein the reaction vessel is a pressure vessel.

20. The process of claim 7, comprising using an aqueous suspension of a premixture of magnesium hydroxide and a pulp.

21. The process of claim 7, further comprising hydrophobizing the complex.

* * * * *